United States Patent [19]

Hodge et al.

[11] Patent Number: 4,784,452
[45] Date of Patent: Nov. 15, 1988

[54] OPTICAL FIBER COUPLER

[75] Inventors: Malcolm H. Hodge, West Simsbury; James A. Moras, Simsbury, both of Conn.; Richard T. Dillon, Southwick, Mass.

[73] Assignee: Ensign-Bickford Optics Co., Avon, Conn.

[21] Appl. No.: 892,799

[22] Filed: Aug. 1, 1986

[51] Int. Cl.[4] ............................................. G02B 6/26
[52] U.S. Cl. ................................. 350/96.15; 350/96.16
[58] Field of Search ................ 350/96.15, 96.16, 96.2, 350/96.29

[56] References Cited

U.S. PATENT DOCUMENTS

| | | | |
|---|---|---|---|
| 3,936,631 | 2/1976 | Muska | 250/227 |
| 3,982,123 | 9/1976 | Goell et al. | 250/227 |
| 4,019,051 | 4/1977 | Miller | 250/227 |
| 4,021,097 | 5/1977 | McMahon | 350/96.15 |
| 4,087,156 | 5/1978 | Kao et al. | 350/96.21 |
| 4,135,780 | 1/1979 | Dyott | 350/96.15 |
| 4,264,126 | 4/1981 | Sheem | 350/96.15 |
| 4,301,543 | 11/1981 | Palmer | 350/96.15 X |
| 4,307,933 | 12/1981 | Palmer et al. | 350/96.16 |
| 4,355,863 | 10/1982 | Aulich et al. | 350/96.15 |
| 4,387,954 | 6/1983 | Beasley | 350/96.15 |
| 4,465,335 | 8/1984 | Eppes | 350/96.15 X |
| 4,515,428 | 5/1985 | Findakly | 350/96.15 X |
| 4,630,255 | 12/1986 | Gouali et al. | 350/96.15 X |

FOREIGN PATENT DOCUMENTS

| | | | |
|---|---|---|---|
| 0147168 | 7/1985 | European Pat. Off. | 350/96.16 |
| 3036868 | 5/1982 | Fed. Rep. of Germany | 350/96.15 |
| 53-68249 | 6/1978 | Japan | 350/96.15 |
| 54-13347 | 1/1979 | Japan | 350/96.15 |
| 54-111363 | 8/1979 | Japan | 350/96.15 |
| 57-27202 | 2/1982 | Japan | 350/96.2 |
| 2020447 | 11/1979 | United Kingdom | 350/96.16 |

*Primary Examiner*—John D. Lee
*Attorney, Agent, or Firm*—Hayes & Reinsmith

[57] ABSTRACT

An optical fiber coupler and method of making same wherein a tap optical fiber free end is adjacent to and facing the unclad region in an intermediate portion of the length of a bus optical fiber at an angle permitting lightwave communication therebetween. A junction medium, preferably a cured resin, encapsulates the tap fiber free end and the bus fiber unclad region to provide a path for the lightwave communication.

25 Claims, 6 Drawing Sheets

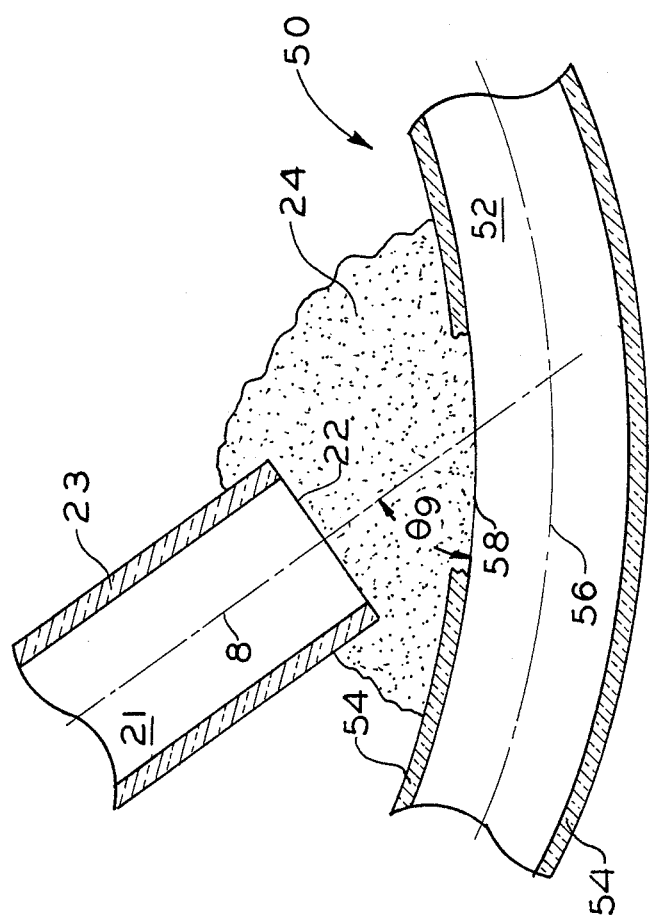

OPTICAL FIBER COUPLER

BACKGROUND OF THE INVENTION

The present invention relates to an optical fiber coupler for adding a lightwave signal to or receiving a lightwave signal from an optical fiber.

One impediment to widespread application of optical fibers in control and communication systems is the limitation in the number of taps in the system because of signal strength losses and reliability problems.

To produce an optical fiber network, such as a local area network, it is generally necessary to interrupt a main line optical fiber, introduce a discrete device and reconnect the main line fiber. The new device has an entry port and an exit port where alignment, insertion and other effects almost invariable produce an excessive dissipation of signal strength at each interface. These losses have proved to be prohibitively high for many applications.

The local network topologies known as the "bus" and "tree" systems suffer from dynamic range limitations and questionable reliability, both features stemming from the aforesaid problems associated with discrete taps. The dynamic range of a bus or tree short haul network might typically be 20dB. With discrete connections geneally offering excess signal losses of 0.5 dB or more per connection, and with two connections per tap, the power budget is quickly consumed in just a few taps, withou even considering the actual tapped signal strength.

In the local network topology known as the "star" system, each node access point is addressed by a dedicated fiber which runs back to a centrally disposed star coupler whose function it is to distribute incoming signals equally to all nodes. The star coupler typically has a predesignated number of ports between which any incoming signal will be evenly divided, regardless of whether or not each port is matched to a node. Very often, more ports will be specified than actually required in order to permit future scale-up. This often puts a strain on the dynamic range capabilities of the system which sees its power budget immediately divided by the number of star coupler ports. If the number of star coupler ports are specified to match existing needs, future expansion will result in problems similar to those discussed with reference to the bus and tree systems.

Several patents disclose side-by-side positioning of optical fibers or waveguides to couple light into and out of main line optical fibers or waveguides without the need to sever the main line optical fibers.

U.S. Pats. Nos. 3,936,631 and 3,982,123 disclose the positioning of a disk-like coupling body between an optical fiber and a photodetector for tapping a portion of the light signal from the fiber.

U.S. Pat. No. 4,021,097 discloses the coupling of an optical fiber with a slab of light propagating material. The fiber cladding is removed in the coupling region and the fiber has a negative curvature which leaves the fiber coupling region under tension.

U.S. Pat. No. 4,355,863 discloses the bundling of optical fibers in which a portion of cladding has been removed. A common coupling zone in the fiber bundle permits light coupling between the fibers.

U.S. Pat. No. 4,387,954 discloses an evanescent wave coupler in which two optical fibers which have a portion of the cladding removed are juxtaposed with an interleaf film between them. The interleaf film secures a constant spatial relationship between the fibers to permit evanescent coupling therebetween.

U.S. Pat. No. 4,264,126 discloses an optical fiber coupler in which a pair of optical fibers with their cladding removed are braided in tension and then placed in a coupling solution.

U.S. Pat. No. 4,087,156 discloses an optical fiber transmission mixer wherein the cladding material is removed from an intermediate region of a plurality of fibers and the exposed fiber cores are encapsulated in a matching or slightly higher refractive index material. The encapsulating region is then enclosed in low index sheath to prevent light from escaping from the mixer.

The prior art couplers which utilize cladding removal are generally low in efficiency, mechanically suspect, and often limited in input or output modes.

It is therefore an object of the present invention to provide an optical fiber coupler which has reduced light signal loss.

It is another object of the present invention to provide an optical fiber coupler which has improved mechanical reliability.

It is a further object of the present invention to provide an optical fiber coupler which may be installed in the field and without severing the bus optical fiber.

It is another object of the present invention to provide an optical fiber coupler which may be used simultaneously in both input and output modes.

SUMMARY OF THE INVENTION

The above and other objects, which will be apparent to those skilled in the art, are achieved in the present invention which comprises in one aspect an optical fiber coupler comprising a length of a bus optical fiber having an unclad region exposing the core in an intermediate portion thereof; at least one tap optical fiber having a free end and a core exposing face thereon, the free end of the tap optical fiber being adjacent to the bus optical fiber with the face of the free end facing the bus optical fiber unclad region, the axes of the tap optical fiber and the bus optical fiber being positioned to permit lightwave communication between the tap optical fiber and the bus optical fiber; and a junction medium encapsulating the tap optical fiber free end face and the bus optical fiber unclad region, the junction medium providing a path for lightwave communication between the tap optical fiber and the bus optical fiber.

In another aspect, the present invention comprises a method for coupling optical fibers by providing at least one continuous length of a bus optical fiber having an unclad region exposing the core in an intermediate portion thereof; providing at least one tap optical fiber having a free end and a core-exposing face thereon; positioning the tap optical fiber free end adjacent to the bus optical fiber with the face of the free end facing the bus optical fiber unclad region; and encapsulating the tap optical fiber free end and the bus optical fiber unclad region with a junction medium, thereby providing for lightwave communication between the tap optical fiber and the bus optical fiber.

BRIEF DESCRIPTION OF THE DRAWINGS

FIG. 9 illustrates a longitudinal cross-section view of a fifth embodiment of the optical fiber coupler of the present invention.

DETAILED DESCRIPTION OF THE INVENTION

The present invention provides an optical fiber coupler and method of making an optical fiber coupler without the necessity of breaking or severing the optical fiber to which a light signal is to be added or removed. The optical fiber to which a light signal is to be added or from which a light signal is to be removed will be referred to herein as the "bus" optical fiber. It is to be understood however that the present invention is not limited to a bus network topology and may be employed in any optical fiber network including the ring, star and tree topologies.

The bus optical fiber which may be used in the coupler of the present invention is preferably that with a stepped index of refraction between the light-guiding core and the cladding. However, a graded index optical fiber may also be employed. Any of the known optical fiber core/cladding material combinations may be used, including glass/glass, glass/polymer, and polymer/polymer. Examples of the glasses which may be used in a fiber core or cladding are fused silica and doped fused silica. Examples of the polymers which may be used in a fiber cladding are silicon elastomers, fluoroelastomers and fluorothermosets. Examples of polymers which may be used in a fiber core are acrylates and methacrylates.

Optical fibers normally have a cladding material surrounding the entire length of the core. In the optical fiber coupler of the present invention, the bus optical fiber must be provided with an unclad region exposing the core in an intermediate region of the fiber length. Normally this will be done by removing cladding from the fiber. Most and preferably all of the cladding should be removed in the designated unclad region. Any conventional process for removing optical fiber cladding may be employed, such as by cutting, scraping or grinding.

The tap optical fiber, through which a light signal may be added to or received from the bus optical fiber, may be of any known combination of core/cladding material, such as those listed previously. Optionally, the tap optical fiber may have no cladding at all. The tap fiber need not match the bus optical fiber in size, material or other characteristics, although this may be desirable for optimum system characteristics. The tap fiber is generally provided with a free end which is substantially perpendicular to the fiber axis, for example, by cleaving or otherwise severing the tap fiber. As will be seen, other tap fiber free end configurations may be advantageously employed.

Figure 1:
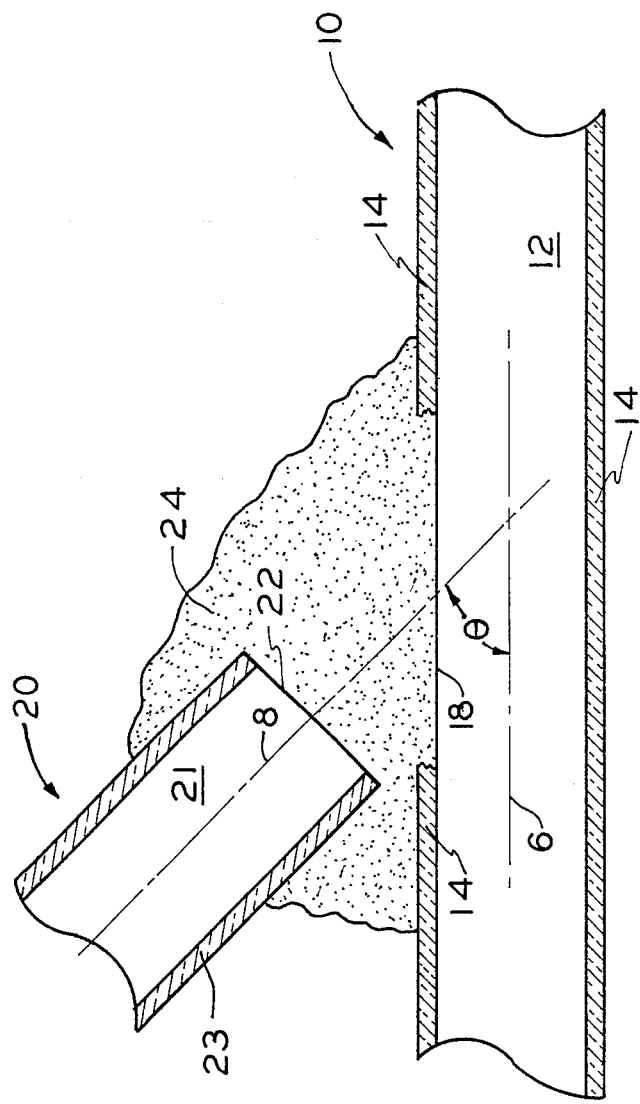
FIG. 1 illustrates a longitudinal cross-section view of a first embodiment of the optical fiber coupler of the present invention.

A first embodiment of an optical fiber coupler of the present invention is illustrated in FIG. 1 in cross-section along a plane parallel to the longitudinal axes of the bus fiber and the tap fiber, 6 and 8, respectively. Bus fiber 10 comprises a straight light-guiding core 12 surrounded by cladding 14. The buffer coating which is normally applied over the cladding is omitted for exemplary clarity. As is conventional in optical fibers, the index of refraction of the core is greater than the index of refraction of the cladding. Unclad region 18 is shown on bus optical fiber 10 wherein the cladding 14 is not present over the core 12.

Tap optical fiber 20 comprises a light-guiding core 21 surrounding by cladding 23 and is shown with a core-exposing free end face 22 generally facing bus opical fiber unclad region 18. The core face on free end face 22 should be clean of impurities and crack free to permit full transmission of light signals therethrough. Included angle $\theta_1$ is formed by the intersection of the projection of the tap optical fiber axis 8 and bus optical fiber axis 6. Free end face 22 is shown substantially perpendicular to axis 8.

Junction media 24 encapsulates tap fiber free end face 22 and bus fiber unclad region 18. More specifically, the junction media 24 contacts both the tap fiber free end face 22 and the bus fiber unclad region 18 and fills the void therebetween to provide a path for lightwave communication between the tap optical fiber and the bus optical fiber. The junction media comprises any optically transparent material having an index of refraction greater than that of bus fiber cladding 14. While a liquid, such as an oil, may be employed, it is preferred that the junction media be a solid which can also provide structural support to hold the tap and bus fibers in a desired predetermined position.

In practicing the method aspect of the present invention to produce an optical fiber coupler, the junction medium may encapsulate the bus fiber unclad region and the tap fiber free end face in an uncured state either before or after the optical fibers are in the desired angular relationship. A resin, preferably an ultra-violet curable resin, may be used as the junction medium and cured after the fibers are in the desired position. This simplified method of producing the optical fiber coupler facilitates field installation of the coupler. A cured resin will also function to provide an environmental seal for the coupler to keep water and other contaminants away from the fiber cores.

Figure 2:
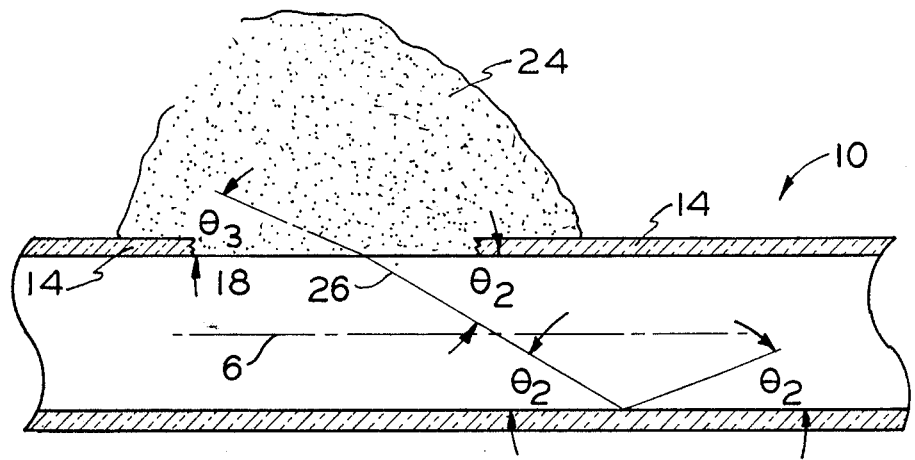
FIG. 2 illustrates a longitudinal cross-section view of the bus optical fiber in the optical fiber coupler of FIG. 1.

FIG. 2 illustrates the bus fiber depicted in FIG. 1 with a typical light ray path 26 for a light ray either entering or leaving bus fiber 10 through unclad region 18. For both the bus and tap fibers depicted in FIGS. 1–3 and 5–6, the core surfaces are parallel to the respective fiber axes, and consequently a light ray within a core makes the same angle with the core surface as with the fiber axis. Light ray 26 makes angle $\theta_2$ with the bus fiber core surface within core 12, and angle $\theta_3$ with the bus fiber core surface within junction media 24. The critical angle $\theta_c$ for total internal reflection of a light ray within bus fiber core 12 represents the maximum angle $\theta_2$ at which a light ray could travel between bus fiber 10 and junction media 24 and be totally propagated within the bus fiber. The critical angle $\theta_c$ is defined by the relationship $$\theta_c = \cos^{-1}\frac{n_3}{n_2}$$

wherein
$n_2$ = index of refraction of bus fiber core
$n_3$ = index of refraction of bus fiber cladding.

Figure 3:
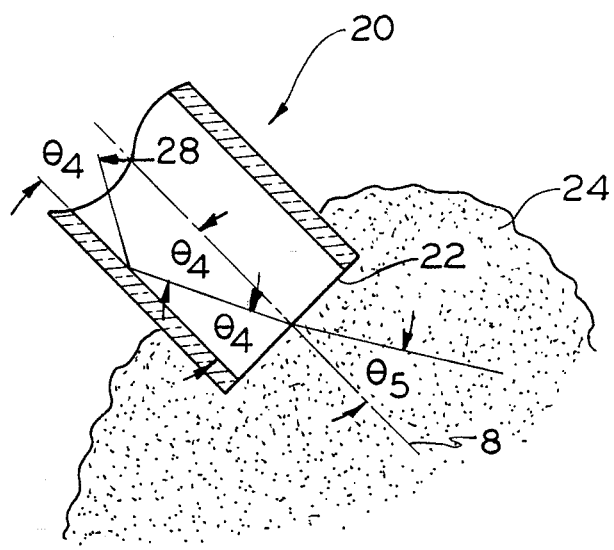
FIG. 3 illustrates a longitudinal cross-section view of the tap optical fiber in the optical fiber coupler of FIG. 1.

The angle $\theta_3$ in junction medium 24 is dependent on angle $\theta_2$ and the respective indices of refraction of the bus fiber core 12 and the junction media 24. The angle $\theta_3$ is referred to as the acceptance angle of the bus fiber unclad region and is defined by the relationship $$0 \leq \theta_3 \leq \cos^{-1}\left[\frac{n_2}{n_1}\cos\theta_2\right]$$

wherein
$n_1$ = index of refraction of junction media
$n_2$ = index of refraction of bus fiber core FIG. 3 illustrates the tap fiber depicted in FIG. 1 with a typical light ray path 28 for a light ray either entering or leaving the free end face 22 of tap fiber 20. Light ray 28 makes angle $\theta_4$ with tap fiber axis 8 at the tap fiber core/cladding interface within the tap fiber core, and angle $\theta_5$ with the projection of tap fiber axis 8 within junction media 24. The maximum angle $\theta_5$ at which a light ray may be emitted from tap fiber 20 or be recieved into tap fiber 20 and totally propagated with the tap fiber is referred to as the acceptance angle of the tap fiber and is defined by the relationship $$0 \leq \theta_5 \leq \sin^{-1}\left[\frac{(n_4^2 - n_5^2)^{\frac{1}{2}}}{n_1}\right].$$

wherein
$n_4$ = index of refraction of tap fiber core
$n_5$ = index of refraction of tap fiber cladding.

Various coupler parameters affect the strength of signal transmission between the tap and bus optical fibers, including the fiber and junction medium materials, the area of bus fiber unclad region 18, the distance between the tap fiber free end 22 and unclad region 18, the diameter of the tap fiber core, and the angle of the tap fiber axis 8 to the bus fiber axis 6. The selection of proper parameters is dependent in part on the manner in which the coupler is to be utilized, i.e., to add a light signal to the bus fiber ("tap on"), to detect a light signal emitted from the bus fiber ("tap off"), or to do both.

Figure 4:
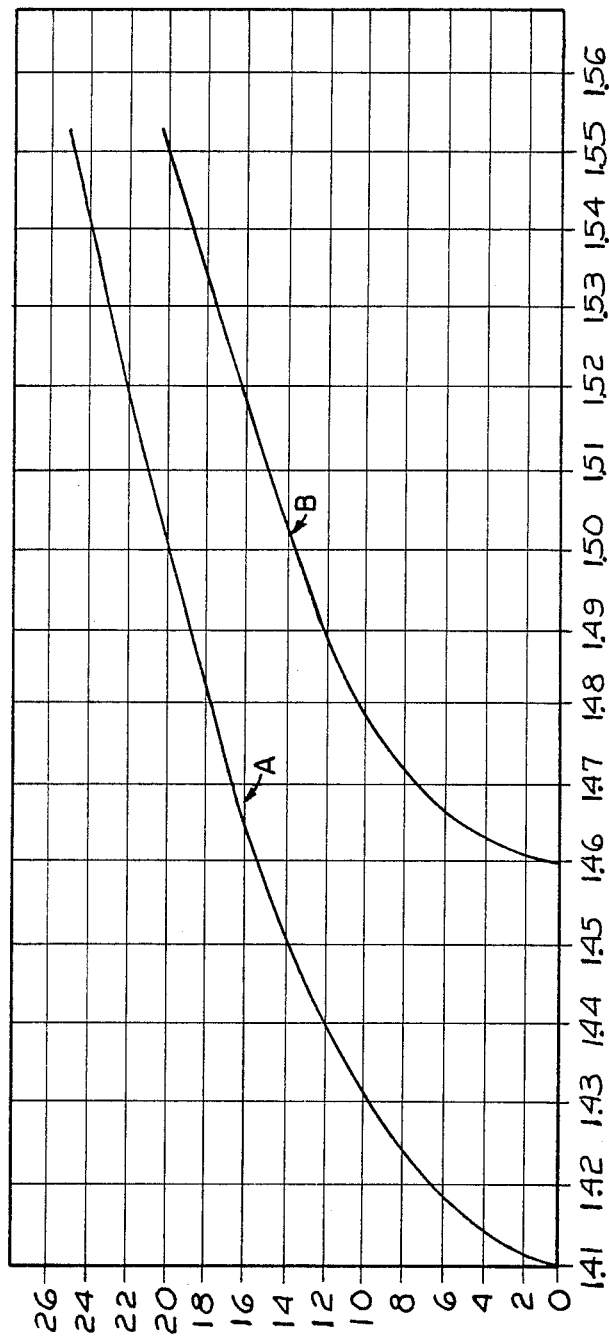
FIG. 4 is a graphical representation of the range of light ray angles to and from a preferred embodiment of the bus fiber in the optical fiber coupler of FIG. 1.

FIG. 4 is a graphical representation of the acceptance angle $\theta$ range of the bus fiber unclad region as a function of the refractive index n of the junction media 24. This acceptance angle range is based on typical bus optical fiber core and cladding index of refraction of 1.46 and 1.41, respectively. The formula for each curve is $$\theta = \cos^{-1}\left[\frac{n_2}{n_1}\cos\theta_2\right]$$

where the maximum acceptance angle curve indicated as A is calculated by setting $\theta_2 = 15°$, the critical angle for the bus fiber having the 1.46/1.41 core/cladding index of refraction combination. The minimum acceptance angle curve indicated as B is calculatd by setting $\theta_2$ equal to zero, the limit of the minimum light angle with respect to the bus fiber.

As is seen in FIG. 4, selection of the junction medium will have an effect on the range of bus optical fiber unclad region acceptance angles. The widest acceptance angle range will occur when the junction media index of refraction equals the bus fiber core index of refraction. The junction medium index of refraction may also be chosen, for example, to concentrate the minimum and maximum acceptance angles in a narrow range to match with tap fibers having small numerical apertures.

The range of permissible angles between the tap fiber axis 8 and the bus fiber axis 6 is dependent on the numerical aperture of the tap fiber in the particular junction media, the critical angle of the bus fiber, and the index of refraction of the junction medium. The maximum included angle between axes 6 and 8 at which light rays may travel between the tap fiber and the bus fiber and be totally propagated in both is the sum of the maximum bus fiber unclad region acceptance angle and the maximum tap fiber acceptance angle. Preferably, the maximum angle is no greater than the maximum bus fiber unclad region acceptance angle. The minimum angle between axes 6 and 8 is zero for a junction media index of refraction less than the fiber core index of refraction or the difference of the minimum bus fiber unclad region acceptance angle and the maximum tap fiber acceptance angle for a junction media index of refraction greater than the fiber core index of refraction.

Where the coupler is to be used in the tap-on configuration, the junction medium should have an index of refraction less than that of the bus fiber core. Where the coupler is to be used in the tap-off configuration, the junction medium index of refraction may be greater than or equal to the bus fiber core index of refraction. This will cause a complete loss from the bus fiber of those light rays (in both low and high order modes) which strike the core/junction media interface at the bus fiber unclad region 18. This may also cause a significant lightwave signal loss in the bus fiber.

Selection of a junction medium index of refraction between that of the bus fiber core and the bus fiber cladding will result in almost no bus fiber rays escaping; even the highest order bus fiber modes will internally reflect at the junction media/bus fiber core interface with effeciencies over 90%. Nevertheless, a substantial portion of the injected light (more than a 10° bus fiber unclad region acceptance angle range, for the parameters in FIG. 4) is still accepted by the bus fiber from the tap fiber in the tap-on mode. In practice, this amounts to a light diode wherein light rays can tap onto the bus fiber while light rays on the bus fiber do not tend to tap off, or escape.

The parameters of tap fiber core diameter, bus fiber unclad region area, and distance between the tap fiber free end and the bus fiber unclad region should be selected to match the projected area of the emitted lightwave signal to the receiving fiber core area. Thus, in the tap-on configuration, the projected area of the lightwave signal emitted from the tap fiber free end is preferably matched to the bus fiber unclad region area. This may be done in several ways, including varying the distance between the tap fiber free end and the bus fiber unclad region, and varying the area of the unclad region. In the tap-off configuration the projected area of the lightwave signal emitted from the bus fiber unclad region is preferably matched to the diameter of the tap fiber core. This may be accomplished in ways corresponding to those of the tap-on configuration matching. Matching the tap fiber core to the unclad region area and placing the two in close proximity permits the coupler to be used in both the tap on and tap off configurations.

Figure 5:
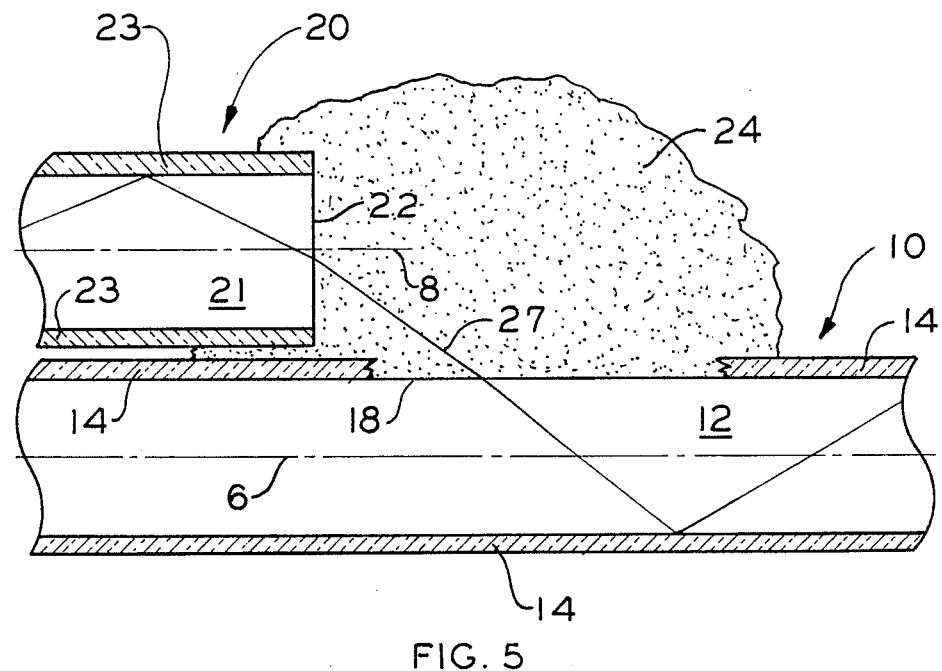
FIG. 5 illustrates a longitudinal cross-section view of the optical fiber coupler of the present invention wherein the tap optical fiber and the bus optical fiber are in parallel relationship.

Proper choice of coupler parameters including bus fiber critical angle, junction medium index of refraction and tap fiber acceptance angle will permit lightwave communication between the tap optical fiber and the bus optical fiber as shown in the configuration illustrated in FIG. 5. Tap optical fiber free end axis 8 is shown as being parallel, i.e., having an angle of zero, with bus optical fiber unclad region axis 6. Light ray 27 is shown between tap optical fiber 20 and bus optical fiber 10. This parallel positioning of the two fibers has the advantage of simplifying coupler assembly by eliminating complex angle measurement between the fibers.

Figure 6:
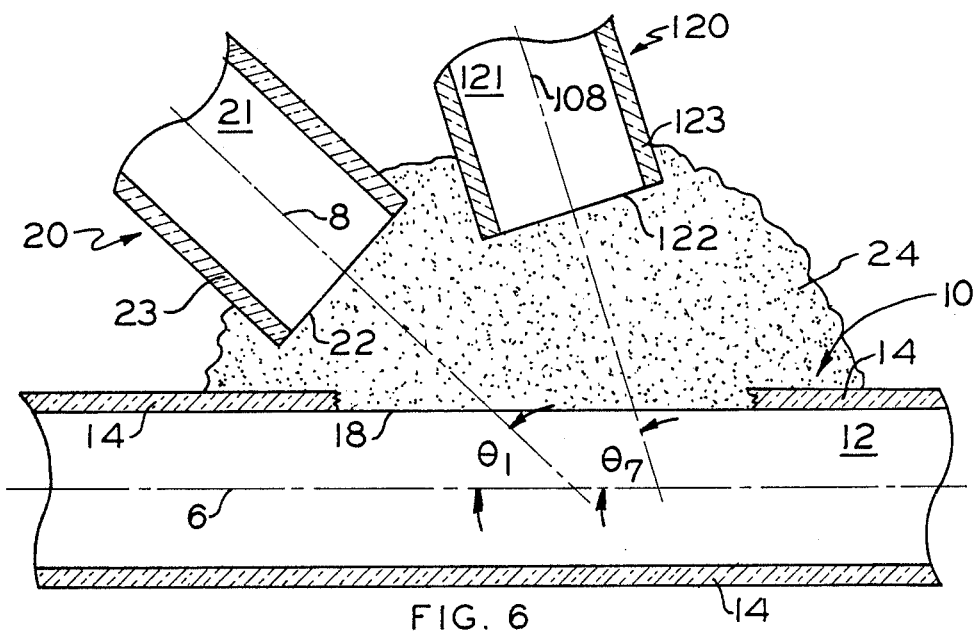
FIG. 6 illustrates a longitudinal cross-section view of a second embodiment of the optical fiber coupler of the present invention.

A second embodiment of the coupler of the present invention is illustrated in FIG. 6 where there is shown the same lightwave communicating relationship between bus fiber 10 and tap fiber 20 as shown in FIG. 1, with an additional tap fiber 120 added to the coupler. Tap fiber 120 is also postioned to permit lightwave communication with bus optical fiber 10. The angle $\theta_7$ between tap fiber 120 free end axis 108 and bus fiber axis 6 may be the same or may be different than angle $\theta_1$. The use of two or more tap fibers in the optical fiber coupler will permit, for example, greater signal strength communication between the tap and bus fibers.

Figure 7:
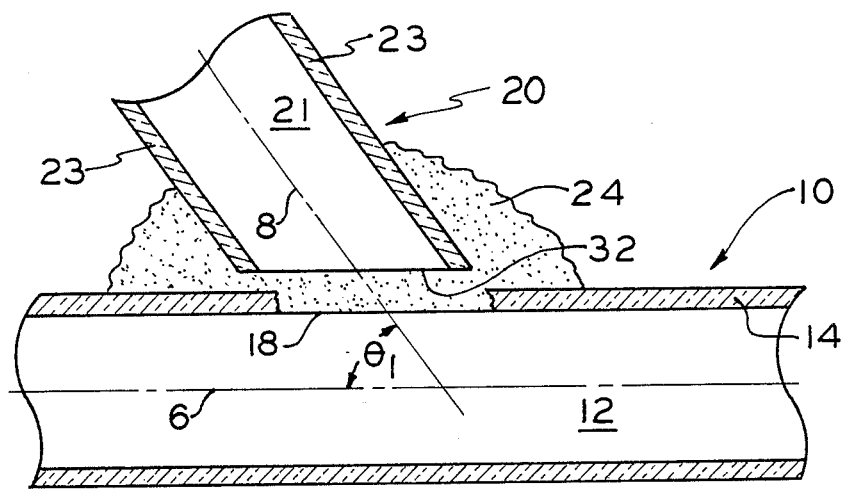
FIG. 7 illustrates a longitudinal cross-section view of a third embodiment of the optical fiber coupler of the present invention.

FIG. 7 illustrates a third embodiment of the present invention wherein there is shown a cross-section of an optical coupler having the same features as in FIG. 1 except that the tap fiber free end face, indicated as 32, is angled to conform to the bus fiber unclad region 18 and is preferably parallel to the unclad region. Angling of the tap fiber free end face as shown permits the tap fiber 20 to be positioned closer to the bus fiber unclad region 18, thereby permitting improved mutual area matching of the tap fiber free end core diameter and the bus fiber unclad region area to the projected area of a lightwave signal emitted from the bus fiber unclad region and tap fiber free end, respectively. This improves the efficiency of the optical coupler in FIG. 5 functioning in both tap-on and tap-off configurations. Angling of the tap fiber free end face 32 as shown will affect the range of tap fiber acceptance angles and consequently will affect the permissible angular orientation between the tap fiber and bus fiber axes. This change in tap fiber acceptance angle may be determined by calculation or by simple experimentation.

Figure 8:
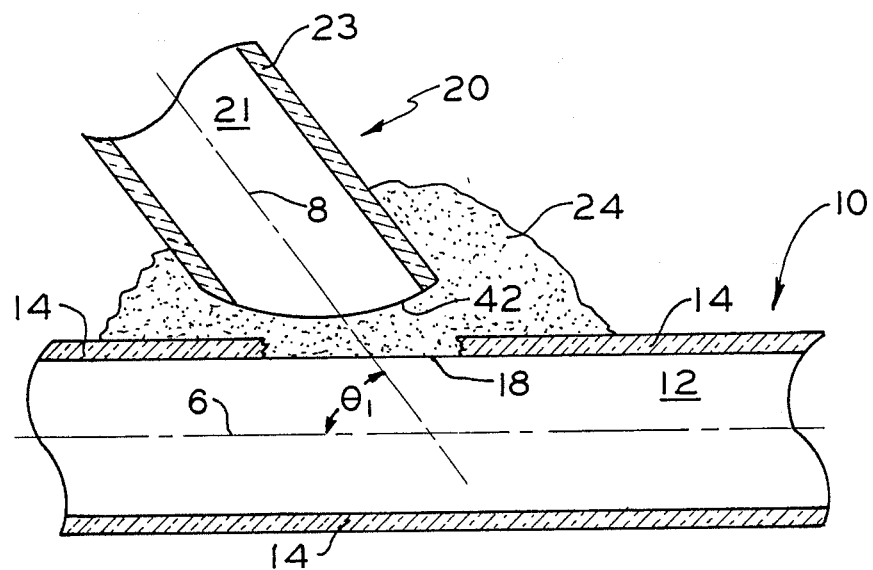
FIG. 8 illustrates a longitudinal cross-section view of a fourth embodiment of the optical fiber coupler of the present invention.

FIG. 8 illustrates a fourth embodiment of the present invention. A cross-section of an optical coupler is shown having the same features as in FIG. 1 except that the tap fiber free end face, indicated as 42, has a convex curvature. This convex curvature provides a continuous change in tap fiber free end face angle from one side of the tap fiber to the other. A free end face convex curvature achieves many of the advantages of the aforedescribed angular free end with the further advantage that a range of angles between the tap fiber and bus fiber axes may now be accommodated. This permits a single tap fiber free end face configuration to accommodate a wide variety of optical coupler parameters.

FIG. 9 illustrates another embodiment of the present invention wherein there is shown an optical coupler having the same features as in FIG. 1 except that the bus optical fiber indicated as 50, has a positive curvature of radius R. The point (not shown) about which bus fiber 30 is curved is on the same side of the bus fiber 50 as is tap fiber 20, thereby placing the core surface at unclad region 58 in compression and the core and cladding surfaces opposite the unclad region in tension. This positive curvature of bus fiber 50 eliminates any tensile stresses on unclad region 58, which is inherently a weak point due to the absence of cladding 54. Because of the curvature of bus fiber 50, the angle at which a light ray strikes the fiber core surface and is internally reflected within bus fiber 50 will change as the light ray travels within the bus fiber. For appropriate curvatures, this will have only a small effect on the range of the angle of acceptance through bus fiber unclad region 58. This effect may easily be determined through calculation or simple experimentation.

While the present invention has been described with reference to specific embodiments, it will be apparent to those skilled in the art that various modifications may be made without violating the spirit and scope of the invention, and that it is intended to cover all changes and modifications of the invention disclosed herein for the purposes of illustration which do not constitute departure from the spirit and scope of the invention.

Having thus described the invention, what is claimed is:

1. An optical fiber coupler comprising:
   a length of a bus optical fiber having an unclad region exposing the fiber core in an intermediate portion thereof;
   at least one tap optical fiber having a free end and a core-exposing face thereon, said free end of said tap optical fiber being spaced from but adjacent to said bus optical fiber with the face of said free end generally facing said bus optical fiber unclad region, the axes of said tap optical fiber and said bus optical fiber being positioned to permit lightwave communication between said tap optical fiber and said bus optical fiber; and
   a junction medium encapsulating said tap optical fiber free end face and said bus optical fiber unclad region, said junction medium filling the space between said tap optical fiber free end face and said bus optical fiber core as providing a path for lightwave communication between said tap optical fiber and said bus optical fiber.

2. The coupler of claim 1 wherein said junction medium is rigid and wherein said junction medium further fixes said tap optical fiber and said bus optical fiber in said position.

3. The coupler of claim 1 wherein the maximum included angle between said tap optical fiber axis and said bus optical fiber axis is no greater than the sum of the maximum bus optical fiber unclad region acceptance angle and the maximum tap fiber acceptance angle.

4. The coupler of claim 1 wherein the maximum included angle between said tap optical fiber axis and said bus optical fiber axis is no greater than the maximum bus optical fiber unclad region acceptance angle.

5. The coupler of claim 1 wherein the axis of said bus optical fiber has a positive curvature at said unclad region.

6. The coupler of claim 1 wherein the tap optical fiber free end face is substantially perpendicular to the tap optical fiber axis.

7. The coupler of claim 1 wherein the junction medium index of refraction is greater than or equal to the bus optical fiber cladding index of refraction.

8. The coupler of claim 1 wherein the junction medium index of refraction is less than the bus optical fiber core index of refraction.

9. The coupler of claim 1 wherein the junction medium index of refraction is between the bus optical fiber core index of refraction and the bus optical fiber cladding index of refraction.

10. The coupler of claim 1 wherein the junction medium comprises a cured resin.

11. An optical fiber coupler comprising:
a length of a bus optical fiber having an unclad region exposing the fiber core in an intermediate portion thereof
at least one tap optical fiber having a free end and a core-exposing face thereon, said free end of said tap optical fiber being spaced from but adjacent to said bus optical fiber with the face of said free end generally facing said bus optical fiber unclad region, the axes of said tap optical fiber and said bus optical fiber being positioned such that the angle between the respective axes is no greater than the sum of the maximum bus optical fiber unclad region acceptance angle and the maximum tap fiber acceptance angle to permit lightwave communication between said tap optical fiber and said bus optical fiber; and
a rigid, cured resin encapsulating said tap optical fiber free end face and said bus optical fiber unclad region and fixing said tap optical fiber and said bus optical fiber at said angle, said cured resin filling the space between providing a path for lightwave communication between said tap optical fiber and said bus optical fiber.

12. The coupler of claim 11 wherein the tap optical fiber free end face is substantially perpendicular to the tap optical fiber axis.

13. The coupler of claim 11 wherein the cured resin index of refraction is greater than or equal to the bus optical fiber cladding index of refraction.

14. The coupler of claim 11 wherein the cured resin index of refraction is less than the bus optical fiber core index of refraction.

15. The coupler of claim 11 wherein the cured resin index of refraction is between the bus optical fiber core index of refraction and the bus optical fiber cladding index of refraction.

16. A method of coupling optical fibers comprising:
(a) providing a length of a bus optical fiber having an unclad region exposing the fiber core in an intermediate portion thereof;
(b) providing at least one tap optical fiber having a free end and a core-exposing face thereon;
(c) positioning said tap optical fiber free end adjacent to but spaced from said bus optical fiber with the face of said free end generally facing said bus optical fiber unclad region; and
(d) encapsulating said tap fiber free end and said bus optical fiber unclad region with a junction medium and filling the space between said free end and said unclad region with a junction medium,
thereby providing for lightwave communication between said tap optical fiber and said bus optical fiber.

17. The method of claim 16 wherein said positioning in step (c) precedes said encapsulating in step (d).

18. The method of claim 16 wherein said junction medium is a resin and wherein said method includes the step of curing said resin following step (d).

19. The method of claim 16 including the step of positioning said tap optical fiber free end at a distance from said bus optical fiber unclad region sufficient to match the diameter of said tap optical fiber free end to the projected area of a lightwave signal emitted from said bus optical fiber unclad region.

20. The method of claim 16 including the step of positioning said tap optical fiber free end at a distance from said bus optical fiber unclad region sufficient to match the area of said bus optical fiber unclad region to the projected area of a lightwave signal emitted from said tap optical fiber free end.

21. A method of coupling optical fibers comprising:
(a) providing a length of a bus optical fiber having a light guiding core and a surrounding layer of cladding;
(b) removing a portion of the bus optical fiber cladding in an intermediate portion of said length to provide an unclad region on said bus optical fiber;
(c) providing at least one tap optical fiber having a free end and a core-exposing face thereon;
(d) positioning said tap optical fiber free end adjacent to but spaced from said bus optical fiber with the face of said free end facing said bus optical fiber unclad region such that the angle between the tap optical fiber axis and the bus optical fiber axis is no greater than the sum of the maximum bus fiber unclad region acceptance angle and the maximum tap fiber acceptance angle;
(e) encapsulating said tap fiber and said bus optical fiber unclad region including the space therebetween with a resin; and
(f) curing said resin,
thereby providing for lightwave communication between said tap optical fiber and said bus optical fiber.

22. The method of claim 21 wherein said positioning in step (d) precedes said encapsulating in step (e).

23. The method of claim 21 wherein said step (d) positioning is at an angle no greater than the maximum bus fiber unclad region acceptance angle.

24. The method of claim 21 including the step of positioning said tap optical fiber free end at a distance from said bus optical fiber unclad region sufficient to match the diameter of said tap optical fiber free end to the projected area of a lightwave signal emitted from said bus optical fiber unclad region.

25. The method of claim 21 including the step of positioning said tap optical fiber free end at a distance from said bus optical fiber unclad region sufficient to match the area of said bus optical fiber unclad region to the projected area of a lightwave signal emitted from said tap optical fiber free end.

* * * * *